US012701186B2

(12) United States Patent
Torrey et al.

(10) Patent No.: US 12,701,186 B2
(45) Date of Patent: Aug. 4, 2026

(54) SYSTEM AND METHOD FOR PERSONALIZING THE LANGUAGE ASSOCIATED WITH OUTBOUND CALLS

(71) Applicant: Neustar, Inc., Reston, VA (US)

(72) Inventors: Jason Torrey, Vienna, VA (US); Guido Jonjie S. Sena, Jr., Reston, VA (US); Jon Peterson, Reston, VA (US)

(73) Assignee: NEUSTAR, INC., Reston, VA (US)

( * ) Notice: Subject to any disclaimer, the term of this patent is extended or adjusted under 35 U.S.C. 154(b) by 0 days.

(21) Appl. No.: 17/327,105

(22) Filed: May 21, 2021

(65) Prior Publication Data

US 2022/0377170 A1 Nov. 24, 2022

(51) Int. Cl.
*H04M 1/56* (2006.01)
*H04M 3/42* (2006.01)
*H04M 3/436* (2006.01)

(52) U.S. Cl.
CPC ..... *H04M 3/4211* (2013.01); *H04M 3/42127* (2013.01); *H04M 3/42136* (2013.01); *H04M 3/436* (2013.01)

(58) Field of Classification Search
CPC ........... H04M 3/4211; H04M 3/42127; H04M 3/42136; H04M 3/436; H04M 3/53333; H04M 15/8044; H04M 1/72409; H04M 3/533; H04M 1/57; H04M 1/663; G06Q 10/06; G06Q 20/04; H04L 65/4015; G06F 16/00
USPC ............................................. 379/88.14, 88.21
See application file for complete search history.

(56) References Cited

U.S. PATENT DOCUMENTS

| | | | | |
|---|---|---|---|---|
| 5,136,633 | A * | 8/1992 | Tejada | G06Q 20/04 |
| | | | | 379/88.2 |
| 8,879,695 | B2 * | 11/2014 | Jackson | H04M 15/8011 |
| | | | | 379/88.14 |
| 2003/0215074 | A1 * | 11/2003 | Wrobel | H04M 1/57 |
| | | | | 379/142.04 |
| 2006/0182245 | A1 | 8/2006 | Steinmetz | |

(Continued)

FOREIGN PATENT DOCUMENTS

| | | | | | |
|---|---|---|---|---|---|
| EP | 0898406 | A2 * | 2/1999 | | H04M 1/663 |
| WO | WO2001/010100 | A1 | 2/2001 | | |
| WO | WO-2019242483 | A1 * | 12/2019 | | G06F 16/00 |

OTHER PUBLICATIONS

European Search Report directed to related European Application No. EP 22 174 307.3, mailed Sep. 20, 2022, 7 pages.

*Primary Examiner* — Md S Elahee
(74) *Attorney, Agent, or Firm* — Sterne, Kessler, Goldstein & Fox P.L.L.C.

(57) ABSTRACT

An approach is described for facilitating an outbound call from a calling party and a called party by displaying specific information on the communication device of the called party. The displayed specific information is based on a communication characteristic of the called party, where the communication characteristic includes a language characteristic of the called party. Based on language characteristic of the called party, customized display content is provided to the communications device of the called party, on or prior to the called party being alerted to the requested communication. The customized display content improves the answer rate and the conversion rate of the outbound call.

20 Claims, 7 Drawing Sheets

500 receiving, from a calling party, an indication of a requested communication between the calling party and a called party, the called party having a communications device; — 502 determining a communication characteristic associated with the called party, wherein the communication characteristic include a language characteristic of the called party; — 504 generating customized display content based on the communication characteristic; — 506 permitting the requested communication to proceed between the calling party and the called party; — 508 causing the customized display content to be transmitted via one or more communications channels and rendered on the communications device on or prior to the called party being alerted to the requested communication. — 510

(56)     References Cited

U.S. PATENT DOCUMENTS

| | | | |
|---|---|---|---|
| 2006/0270453 A1* | 11/2006 | Di Giorgio ....... | H04M 15/8044 |
| | | | 455/558 |
| 2007/0081643 A1* | 4/2007 | Divine .............. | H04M 1/72409 |
| | | | 379/100.01 |
| 2010/0094616 A1* | 4/2010 | Woodring ......... | H04M 3/53333 |
| | | | 704/2 |
| 2013/0272513 A1 | 10/2013 | Phadnis et al. | |
| 2016/0381215 A1 | 12/2016 | Goyal et al. | |
| 2020/0067993 A1* | 2/2020 | Eskafi ................. | H04L 65/4015 |

* cited by examiner

100

500

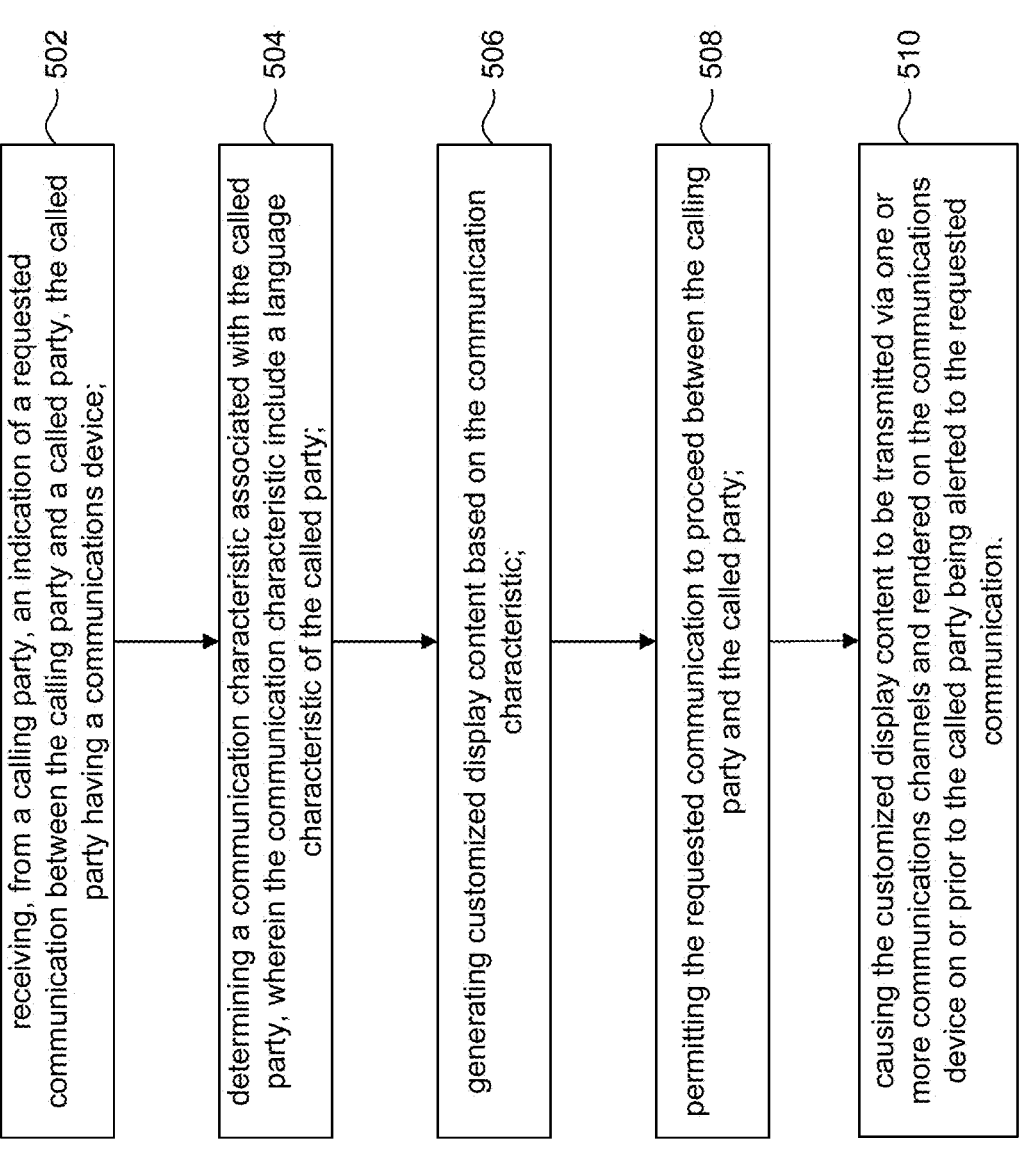

receiving, from a calling party, an indication of a requested communication between the calling party and a called party, the called party having a communications device;

502 determining a communication characteristic associated with the called party, wherein the communication characteristic include a language characteristic of the called party;

504 generating customized display content based on the communication characteristic;

506 permitting the requested communication to proceed between the calling party and the called party;

508 causing the customized display content to be transmitted via one or more communications channels and rendered on the communications device on or prior to the called party being alerted to the requested communication.

SYSTEM AND METHOD FOR PERSONALIZING THE LANGUAGE ASSOCIATED WITH OUTBOUND CALLS

FIELD

The present disclosure relates generally to telecommunications, and more specifically to personalizing the language used in outbound calls in a communication to a called party.

BACKGROUND

Historically, communications from businesses to called parties were straightforward mundane activities that did not require much beyond a telephone line and the telephone number of the called party for the outbound call to be made and the relevant business transacted. Today, businesses now need to compete for the attention of the called parties, both to get their outbound call answered and for the business transaction to be successfully transacted.

SUMMARY

Aspects and advantages of embodiments of the present disclosure will be set forth in part in the following description, or may be learned from the description, or may be learned through practice of the embodiments.

An embodiment includes a method that includes receiving, from a calling party, an indication of a requested communication between the calling party and a called party, the called party having a communications device. The method further includes determining a communication characteristic associated with the called party, wherein the communication characteristic include a language characteristic of the called party. The method also includes generating customized display content based on the communication characteristic. In addition, the method includes permitting the requested communication to proceed between the calling party and the called party. The method also includes causing the customized display content to be transmitted via one or more communications channels and rendered on the communications device on or prior to the called party being alerted to the requested communication.

Another embodiment includes an apparatus that includes memory, and one or processors coupled to the memory. The memory stores instructions that when executed by the one or more processors cause the one or more processors to receive, from a calling party, an indication of a requested communication between the calling party and a called party, the called party having a communications device. The instructions further cause the one or more processors to determine a communication characteristic associated with the called party, wherein the communication characteristic include a language characteristic of the called party. The instructions also cause the one or more processors to generate customized display content based on the communication characteristic. In addition, the instructions also cause the one or more processors to permit the requested communication to proceed between the calling party and the called party. The instructions also cause the one or more processors to cause the customized display content to be transmitted via one or more communications channels and rendered on the communications device on or prior to the called party being alerted to the requested communication.

This Summary is provided merely for purposes of reviewing some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Detailed discussion of embodiments directed to one of ordinary skill in the art is set forth in the specification, which makes reference to the appended figures, in which:

FIG. 5 depicts a flow diagram for providing display information to accompany communications, according to example embodiments of the present disclosure;

DETAILED DESCRIPTION OF THE INVENTION

Figure 1:
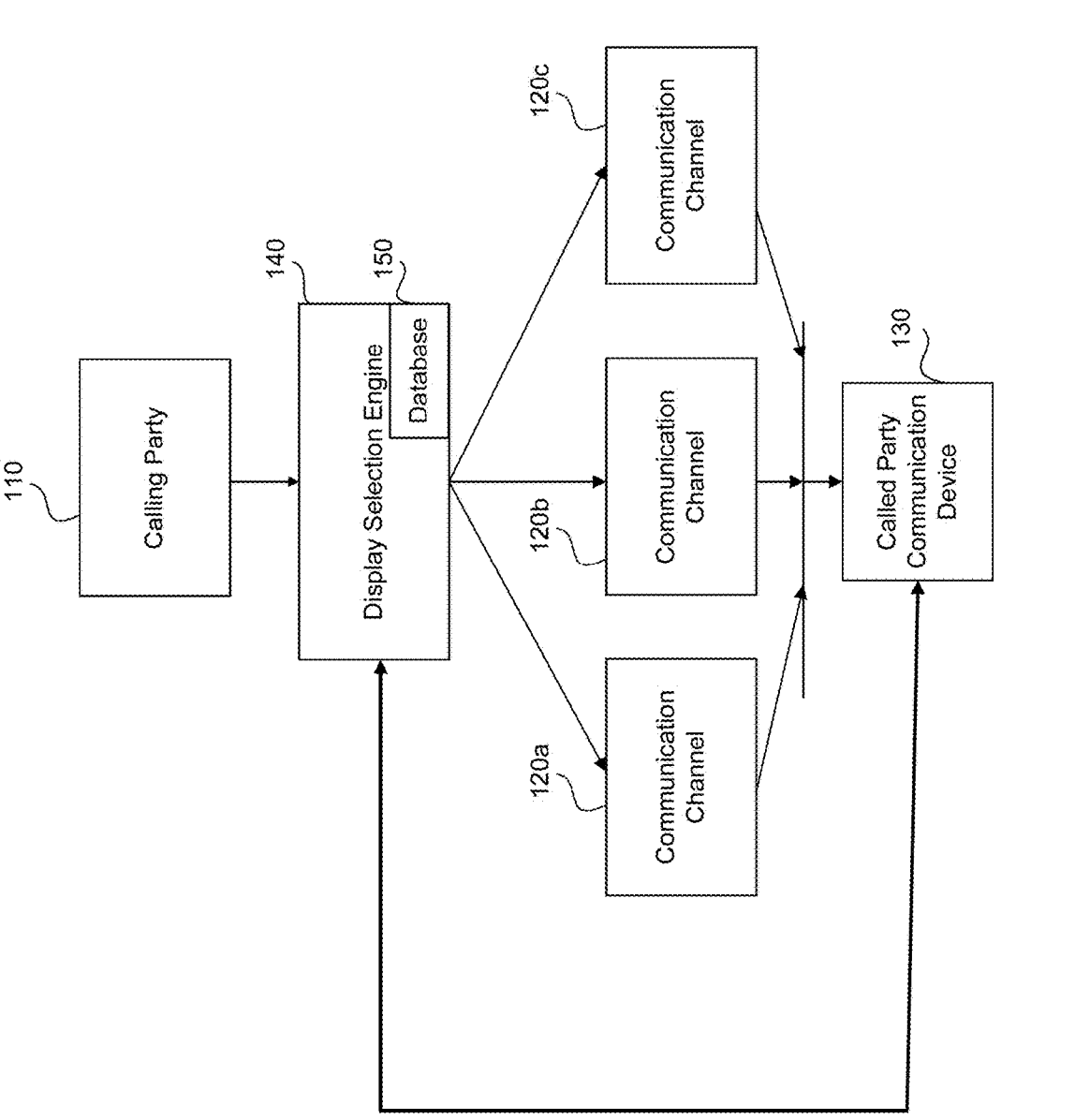
FIG. 1 depicts an example system, according to example embodiments of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to the presentation of a business brand or identity in a preferred language to an end called party during a telephone call. Technology is described that permits a wide variety of outcomes that may be beneficial to the business originating the telephone call. For example, the business may wish to offer different brand or identity displays based on one or more inputs. Such inputs include the type of brand or identity display, a priori knowledge of the end called party, the type of phone in use by the end called party, the different channels available for connection between the business and the end called party, and a metric that reflects the amount of resource available to support the branding or identification for the call. To be effective for the called party, it is desirable that the business brand or identity be displayed or rendered in the preferred language of the called party.

Overview

The scope of the invention provides calling parties with a way to personalize their outbound calling experiences such that (a) the called party receives displays in a language appropriate to the called party, where such language includes one or more of names, branding or identification, call reasons, and other content; and (b) the agent of the calling party assigned to or associated with the call speaks that language. The language personalization results from a query to a Display Selection Engine at the time of the outbound call.

By way of example, a calling party (e.g., enterprise, business) makes an outbound call to a specific called party (identified by, for example, their called party number). Other identifiers that may be used to identify the specific called party include an e-mail address, a user-name, and the like. In the process of making that outbound call, the calling party queries the Display Selection Engine to obtain the best identity-related information including, but not limited to, the language characteristic of the person being called and supporting displayable assets (e.g., name, logo, call reason) in that language.

Calling parties (e.g., enterprises, businesses) struggle with language association today. Typically, most people grow up with one language and prefer that language throughout the entirety of their lives. At most, there is one conversion of a language during a lifetime (e.g., an immigrant who speaks Chinese growing up and changes to English after moving to the United States). Otherwise, language characteristics of an individual are reasonably static. With that in mind, it is more intuitive for a calling party to use a language that is most aligned with the language characteristic of the called party. Currently, businesses and enterprises are aware of the criticality of language, as they typically offer a choice between English and Spanish for inbound calls. In terms of outbound calls, businesses that figure out how to meet called parties on their turf (e.g., language) will gain an advantage in the marketplace. Thus, using technology to enable businesses and enterprises to customize their outbound calls to their called parties will have an advantage. Such an advantage may be shown in terms of various metrics, such as increased acceptance rate (i.e., the called party accepts the call), increased conversion rate (i.e., the call advances the purpose of the call in terms of the business objectives of the call), and the like.

Calling Party

As illustrated in FIG. 1, calls originate from a calling party 110 to a called party communications device 130. In certain embodiments, calling party 110 seeks to provide a particular display at the called party communications device 130 using input from Display Selection Engine 140. In placing such a call, calling party 110 contacts Display Selection Engine 140 by providing the telephone number of the intended recipient of the call. Based on communication characteristic information known to Display Selection Engine 140, Display Selection Engine 140 selects the display information, if any, to accompany the call and arranges for the selected display information to be displayed at the called party communications device 130 prior to, or simultaneously with a notification of an incoming call to the called party communications device 130.

In certain embodiments, calling party 110 may provide an indication of a call to a called party to Display Selection Engine 140, which then selects the display information to accompany the call. Calling party 110 completes the call via one of communications channels 120 to called party communication device 130, with the selected display elements accompanying the call in either the same communications channel 120 as the call, or in a separate, parallel communications channel 120 to called party communication device 130. In certain other embodiments, calling party 110 may provide an indication of a call to a called party 130 to Display Selection Engine 140, which then makes a selection of the display elements to accompany the call.

Called Party Communication Device

As illustrated in FIG. 1, an outgoing call from calling party 110 is intended for a called party having called party communication device 130. In an embodiment, called party communication device 130 can correspond to a mobile computing device, which includes wireless broadband and cellular connectivity for enabling voice and data network functionality. In other embodiments, called party communication device 130 can correspond to any device, which can receive incoming telephone calls. According to other examples, the called party communication device 130 can correspond to any device, which can receive messages, such as SMS or MMS messages. Still further, in some examples, the called party communication device 130 can display caller information, in connection with phone and messaging services provided on that computing device. By way of example, the called party communication device 130 can include a mobile computing device having capabilities for receiving (and initiating) phone calls over a cellular connection (e.g., voice channel), PSTN connection and/or IP connection. In some variations, the called party communication device 130 can include a mobile computing device having capabilities for receiving messages (e.g., SMS or MMS messages) over a cellular or IP network channel. Such mobile computing devices may also perform other types of operations, such as data network operations (e.g., Internet browsing) using a Wireless Fidelity (e.g., 802.11(a), 802.11 (b), 802.11(g), 802.11(n), Wi-Fi Direct, etc.) or cellular connection. In variations, the called party communication device 130 can be implemented under alternative computing platforms, such as either a personal computer (e.g., desktop or laptop computer), a dedicated telephony device with data network connectivity, or a cable box or service with Voice-Over Internet Protocol ("VoIP") telephony.

Figure 2:
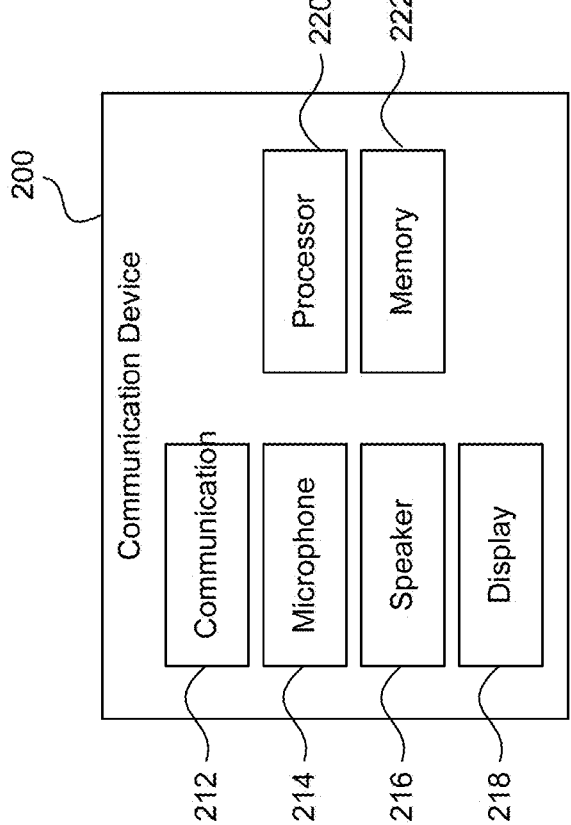
FIG. 2 depicts an exemplary communication device, according to example embodiments of the present disclosure.

Referring to FIG. 2, an exemplary called party communication device 130 is illustrated by communication device 200. Communication device 200 includes processor 220, memory 222, communication module 212, microphone 214, speaker 216 and display 218. In various embodiments, display 218 may include text-only displays, liquid crystal device (LCD) displays, touchscreen displays, and other displays that provide a visual communication of information relevant to the call. Additionally, the communication device 200 can include one or more kinds of memory resources, such as provided by operating system memory (such as Read Only Memory or "ROM")) and application memory (such as Random Access Memory or "RAM"). The communication module 212 can enable one or more of the following: cellular voice communications, high-bandwidth wireless (or network) communication suitable for Internet protocol ("IP") data communication applications and resources (e.g., an 802.11 protocol, or "Wi-Fi"). Still further, the communication module 212 can also be used for voice communications using a wireless medium such as Wi-Fi. For example, some service providers can enable voice or data communications through non-cellular wireless communication ports (e.g., cellular service providers can enable voice calls to be received or made through a Wi-Fi connection). In some implementations, the selection of the particular communication port can be made dependent on the factors such as the device location, the device's connection quality or strength through the respective communication ports, user preference, device software or hardware resources, or other considerations. In other variations, the communication module 212 can enable both voice and data communications for purpose of implementing an example of communication device 200. Thus, in implementation, communication device 200 can have more or fewer communication ports, with each communication being enabled for voice, data or voice and data. Moreover, one or more additional communication ports can be included with communication device 200 for enabling communications using alternative wireless or wireline communication mediums. Communication device 200 may include mobile phones, landline phones, and other devices which afford communication via an identifying number (e.g., telephone number) such as Echo, Alexa and other like personal assistance devices.

In an example of FIG. 1, the called party communication device 130 may execute instructions for operating a telephone application. As an addition or alternative, the called party communication device 130 executes the instructions for operating a messaging application (e.g., SMS application).

In operation, the called party communication device 130 receives an incoming communication. The incoming communication may be an incoming call or a new message. The incoming communication may be received on the called party communication device 130 via, for example, communication channels 120. In some examples, the incoming communication is a telephone call, and the displayed information is obtained and displayed to augment or replace, for example, conventional caller identifier information. In variations, the incoming communication is a new message, and the contact information is obtained and displayed as part of, for example, a text message, or a message header or identifier when the message is listed in a folder (e.g., inbox) or opened for viewing. As described in greater detail, the content information may include rich content (e.g., logos and images, text, textual information about the contact, etc.) that is created and/or configured by the contact. In this way, Display Selection Engine 140 enables calling party 110 who are owners or holders of communication identifiers to select display information that is displayed on their behalf when the calling party 110 performs a corresponding communication activity (e.g., make a phone call, send a message). Furthermore, the rendering of the content information on the called party communication device 130 provides confirmation to the receiver regarding the identity of the contact who is responsible for the incoming communication.

In implementations which display caller contact information, called party communication device 130 can receive the content information from Display Selection Engine 140 when the incoming call is received. The content information can be rendered while, for example, an incoming call is pending on the called party communication device 130. In some implementations, caller content information is rendered on the called party communication device 130 before the call is made known (e.g., a ring tone) to the user, or alternatively, before the call is answered. The processor 220 receives the caller information via the communications module 212, and then renders the caller content. The caller content can be based on or derived from the caller content information provided via communication module 212. The caller content can be rendered as text or media using the display 218. In variations, the caller content can be generated in whole or in part as audio output.

In some embodiments, called party communication device 130 may include a plurality of communications devices, where each of the plurality communications device being associated with the called party. For example, a called party may have an iPhone, an iPad and an Apple Watch, all of which are configured to be associated with the called party. A call placed to this called party may be received at all of these devices, and branding or identification elements may be rendered on all of these devices. In some embodiments, branding or identification elements that are rendered on each device during a particular call may be selected individually for each device, or the same selection may be applicable across all devices. In some embodiments, the branding or identification elements are rendered or displayed in the communication characteristic (e.g., language) of the called party.

In other embodiments, whether there by one or multiple called party communication devices 130 associated with a particular called party, more than one communications channel 120 may be selected for provisioning of the branding or identification elements to the called party communications device(s) 130. Such embodiments include provisioning that is distributed across the multiple communications channels 120 based on additional sub-rules within a composite rule. Such embodiments also include provisioning that is distributed across the multiple communications channels 120 such that a different communications channel is used for each called party communications device 130, again using sub-rules within a composite rule.

In the context of this description, calls may include telephone calls, text messages, and multimedia calls. Multimedia calls are calls, which include video or other graphical elements that accompany an audio call between the calling party and called party. Examples of multimedia calls include Skype calls or similar online calls. In providing branding or identification information of the calling party to the called party in the language characteristic of the called party, the branding or identification information may be in text (e.g., ASCII) or may be embedded within a graphic, such as a logo.

Display

Figure 3:
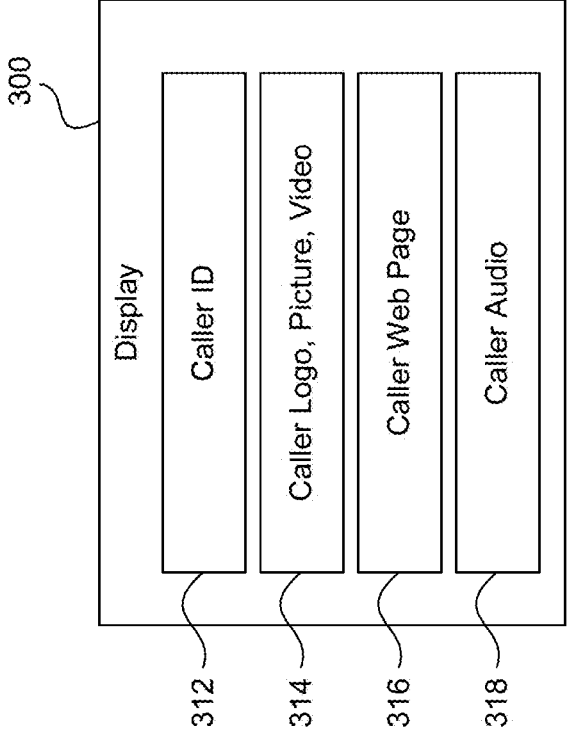
FIG. 3 depicts exemplary display interfaces, according to example embodiments of the present disclosure.

As illustrated in FIG. 2, display 218 may provide a rendering of the chosen display information upon receipt of an incoming call. FIG. 3 illustrates some examples of the displayed information that may accompany the incoming call, in accordance with various embodiments of the approach described herein. In one embodiment, a text-based caller ID in the language of the called party would be provided to accompany the incoming call. In yet another embodiment, a caller logo, a caller-selected picture, or a caller-selected video is provided to accompany the incoming call, where again, the language used in these displays is selected based on the language characteristic of the called party. In a still further embodiment, a web page may be provided to accompany the incoming call, where again, the language used in the web page is selected based on the language characteristic of the called party. In certain embodiments, the web page may be used by the recipient of the call to interactively communicate with calling party 110 during and/or after the incoming call. In yet another embodiment, a special audio sound (or sounds, e.g., a tune), again chosen based on the language characteristic, may also accompany the incoming call. Each of these examples of display information is selected as being aligned with the communication characteristics of the called party 130. In certain embodiments, the display information is aligned with the language characteristic of called party 130.

Language characteristic of called party 130 may include one or more of the language naturally spoken and/or used by called party 130. Language characteristic of called party 130 may also include a particular dialect used by called party 130.

Display Selection Engine and Database

Upon initiating of a telephone call from a calling party 110 to a called party with called party communication device 130, calling party 110 provides an indication of the outbound call to Display Selection Engine 140. From the indication of the outbound call, Display Selection Engine 140 selects the language of display information to be forwarded to called party communication device 130. The choice of language of display information is made by Display Selection Engine 140. Display Selection Engine 140 uses a rule-based decision engine that selects the language of display information to accompany the call to called party communication device 130.

Choice of language of display information may depend on one or more factors, including the factors associated with either end of the call, as well as factors associated with connectivity elements such as the communications channels. With respect to the factors associated with the originating end of the call, such factors include the originating telephone number, and thereby the enterprise that initiated the call, since the enterprise will provide a set of branding or identification elements from which a selection will be made for the particular call. At the terminating end of the call, such factors include the terminating telephone number of the called party communication device 130, and information related to the called party associated with the called party communication device 130. For example, called party communication device 130 may have certain capabilities that either permit or do not permit certain selected branding or identification elements from being rendered. Similarly, the called party may have recorded preferences that are accessible to Display Selection Engine 140 that influence the choice of selected branding or identification elements, e.g., preferences to not receive branding or identification elements at all due to use of bandwidth and the like, preferences to not receive branding or identification elements associated with certain types of organizations (e.g., political organizations, certain industries with a mixed reputation and the like). With respect to factors associated with connectivity elements such as the communications channels, these include the following: time of the call, cost of the call, date of call, bandwidth in the available communications channels.

Figure 4:
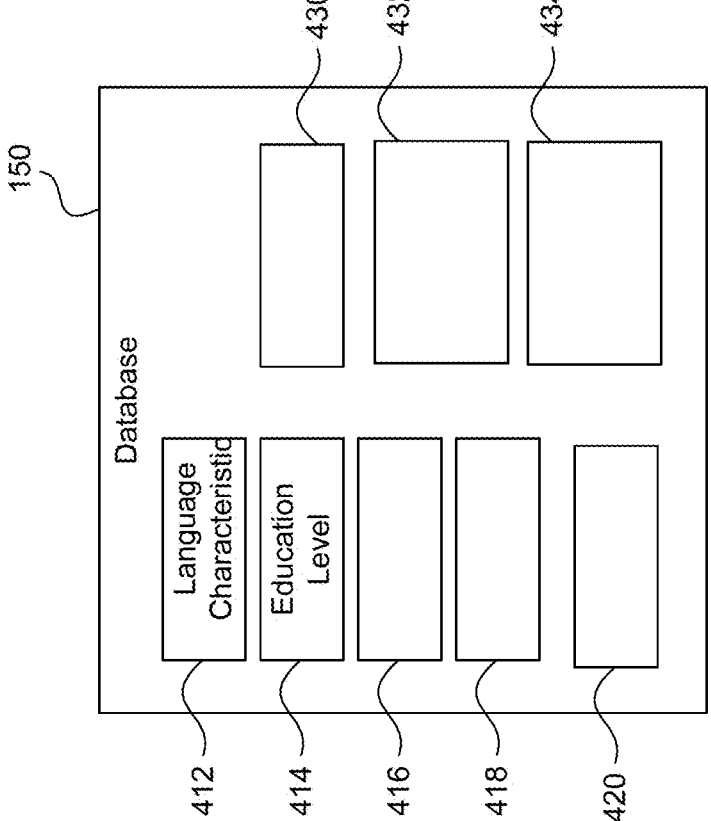
FIG. 4 depicts an example database system according to example embodiments of the present disclosure.

Display Selection Engine 140 is coupled to database 150, which stores information, including the information used by Display Selection Engine 140 to select the language of display information to accompany the call (or message) to end user communication device 130. Thus database 150 can be implemented in order to provide a database service for providing language associated with the provision of branded or identification content for one or more calling parties 110. When implemented in connection with telephony services, the database 150 provides display information, in the appropriate language, that is ultimately provided to the called party communication device 130 when the called party communication device 130 receives an incoming call. When implemented in connection with messaging services, the database 150 may also provide display information, in the appropriate language, that is ultimately provided to the called party communication device 130 when the end user computing device 130 receives a new message. According to one aspect, and as shown in FIG. 4, database 150 stores a record for each previously known called party, where the record includes the language characteristic (e.g., preferred language) 412 of the called party. Other field(s) in the record provide a means of identification of the called party, including one or more of telephone number, e-mail address, user-name and the like.

Database 150 may not have a language characteristic entry 412 for a particular called party associated with called party communication device 130. In that situation, Display Selection Engine 140 may search external sources of information for the language characteristic entry, and use that information from the external source. In such a scenario, the language information from the external source may be stored in language characteristic entry 412 in database 150 for future use. In other embodiments when database 150 may not have a language characteristic entry 412 for a particular called party, a default language may be used. More generally, a default set of caller identity data may be used in some of these embodiments. In some other embodiments, no caller identity data may accompany the call in these situations.

In other embodiments, Display Selection Engine 140 may use a rule that includes logic based on artificial intelligence-based decision making or learned experiences. Such embodiments may capture the learned experiences to deduce the language characteristic of a called party 130, and provide that language characteristic entry 412 for called party 130 in database 150.

Methodology

FIG. 5 depicts a flow diagram of an example method 500 of providing display information in a language matching the language characteristic of a called party according to example aspects of the present disclosure. For instance, at (502), the method (500) can include receiving, from a calling party, an indication of a requested communication between the calling party and a called party, the called party having a communications device. For example, a calling party 110 may be an enterprise or a business, and a communication device may be communication device 130, as discussed above.

At (504), the method (500) includes determining a communication characteristic associated with the called party, wherein the communication characteristic includes a language characteristic of the called party.

At (506), the method (500) includes generating customized display content based on the communication characteristic. An example of customized display content may include caller ID, text or graphics in the correct language, as discussed above.

At (508), the method (500) includes permitting the requested communication to proceed between the calling party and the called party.

At (510), the method (500) includes causing the customized display content to be transmitted via one or more communications channels and rendered on the communications device on or prior to the called party being alerted to the requested communication.

Other Communication Devices

Figure 6:
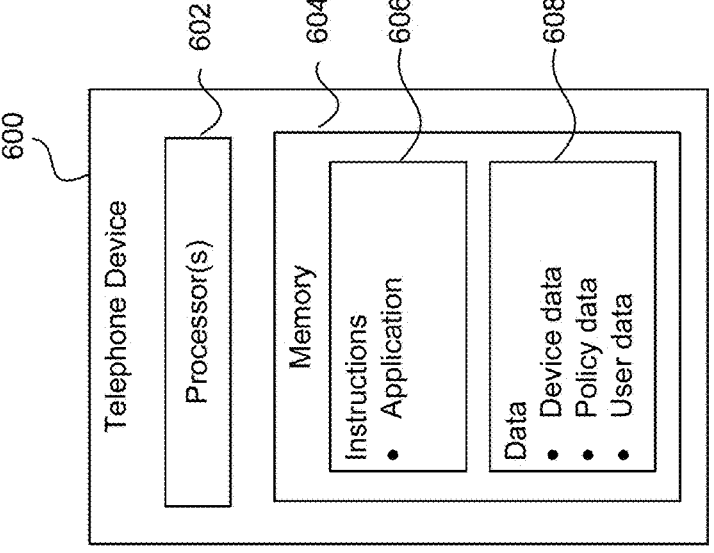
FIG. 6 depicts an example telephone device according to example embodiments of the present disclosure.

FIG. 6 depicts an example telephone device 600 that can be used with the methods and systems of the present disclosure. Telephone device 600 can include one or more processor(s) 602 and a memory 604. The one or more processor(s) 602 can include one or more central processing units (CPUs), and/or other processing devices. The memory 604 can include one or more computer-readable media and can store information accessible by the one or more processors 602, including instructions 606 that can be executed by the one or more processors 602, and data 608. The data 608 can include device data, policy data, user data, and other data. The telephone device 600 can store further instructions for implementing further functionality according to example aspects of the present disclosure.

The telephone device 600 can include various input/output devices for providing and receiving information from a user, such as a touch screen, touch pad, data entry keys, speakers, and/or a microphone suitable for voice recognition. For instance, the telephone device 600 can have a display for presenting a user interface to a user.

The telephone device 600 can further include a positioning system. The positioning system can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

Telephone device 600 can also include one or more network interfaces used to communicate with other devices, such as communication channels 120. The network interface(s) can include any suitable components for interfacing with one more networks, including for example, transmitters, receivers, ports, controllers, antennas, or other suitable components. As explained, connections between telephone device 600 and communication channels 120 can include one or more networks, such as one or more carrier networks and/or internal party networks, and/or one or more switches, routers, etc.

Figure 7:
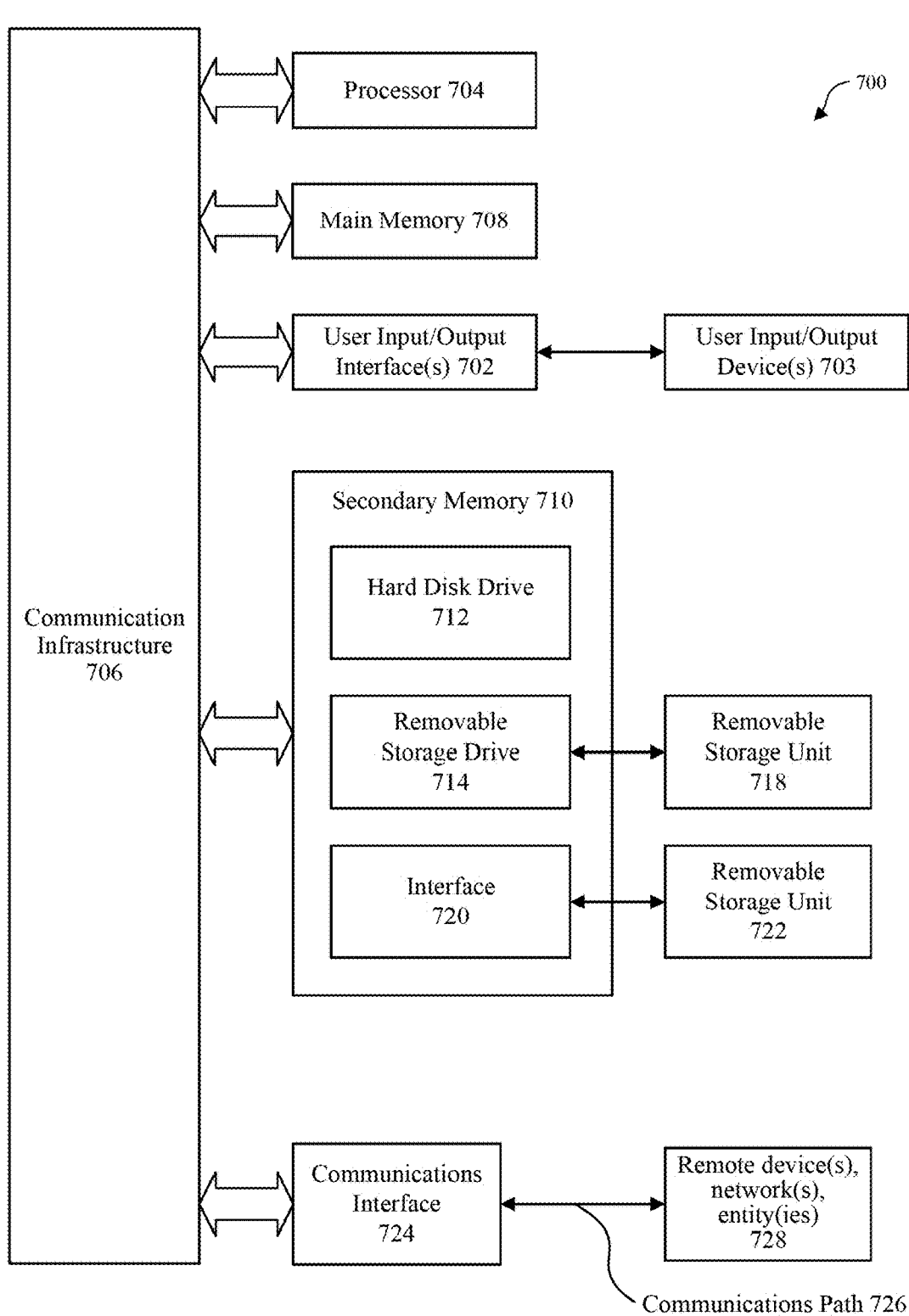
FIG. 7 depicts an example computing system according to example embodiments of the present disclosure.

Various aspects can be implemented, for example, using one or more computer systems, such as computer system 700 shown in FIG. 7. Computer system 700 can be any well-known computer capable of performing the functions described herein such as devices 140 and 150 of FIG. 1. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/ any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method comprising:
receiving, from a calling party, an indication of a requested communication between the calling party and a called party, the called party having a communications device, wherein the requested communication is inchoate upon receipt of the indication;
determining a communication characteristic associated with the called party, wherein the communication characteristic includes a language characteristic of the called party, the language characteristic being based on a priori knowledge known by the calling party about the called party;
generating customized display content based on the communication characteristic, wherein the customized display content includes at least one of a caller name, a call reason, a caller logo, a caller-selected picture, or a caller-selected video;
permitting the requested communication to proceed between the calling party and the called party; and
causing the customized display content to be transmitted via one or more communications channels and rendered on the communications device on or prior to the called party being alerted to the requested communication.

2. The method of claim 1, wherein the requested communication is a telephone call or a text message.

3. The method of claim 1, wherein the communication characteristic is received from a database that is populated using historical information.

4. The method of claim 1, wherein the called party is an existing customer, a previous customer, or a prospective customer of the calling party.

5. The method of claim 1, further comprising causing an agent of the calling party to be selected as a caller based on the language characteristic.

6. The method of claim 1, further comprising causing additional display content to be transmitted via the one or more communications channels and rendered on the communications device following conclusion of the requested communication.

7. The method of claim 1, wherein the customized display content further depends on one or more policy criteria of the calling party.

8. The method of claim 1, wherein the customized display content further depends on technical capabilities of the communications device.

9. The method of claim 1, wherein the communication characteristic further includes a level of education of the called party.

10. The method of claim 1, further comprising:
receiving from the calling party a contact number associated with the called party; and
determining from the communication characteristic a different contact number associated with the called party, the requested communication being effected using the different contact number.

11. An apparatus, comprising:
memory; and
one or processors coupled to the memory, the memory storing instructions that when executed by the one or more processors cause the one or more processors to:
receive, from a calling party, an indication of a requested communication between the calling party and a called party, the called party having a communications device, wherein the requested communication is inchoate upon receipt of the indication;
determine a communication characteristic associated with the called party, wherein the communication characteristic includes a language characteristic of the called party, the language characteristic being based on a priori knowledge known by the calling party about the called party;
generate customized display content based on the communication characteristic, wherein the customized display content includes at least one of a caller name, a call reason, a caller logo, a caller-selected picture, or a caller-selected video;
permit the requested communication to proceed between the calling party and the called party; and
cause the customized display content to be transmitted via one or more communications channels and rendered on the communications device on or prior to the called party being alerted to the requested communication.

12. The apparatus of claim 11, wherein the requested communication is a telephone call or a text message.

13. The apparatus of claim 11, wherein the communication characteristic is received from a database that is populated using historical information.

14. The apparatus of claim 11, wherein the called party is an existing customer, a previous customer, or a prospective customer of the calling party.

15. The apparatus of claim 11, further comprising causing an agent of the calling party to be selected as a caller based on the language characteristic.

16. The apparatus of claim 11, further comprising causing additional display content to be transmitted via the one or more communications channels and rendered on the communications device following conclusion of the requested communication.

17. The apparatus of claim 11, wherein the customized display content further depends on one or more policy criteria of the calling party.

18. The apparatus of claim 11, wherein the customized display content further depends on technical capabilities of the communications device.

19. The apparatus of claim 11, wherein the communication characteristic further includes a level of education of the called party.

20. The apparatus of claim 11, wherein the instructions further cause the one or more processors to:

receive from the calling party a contact number associated with the called party; and determine from the communication characteristic a different contact number associated with the called party, the requested communication being effected using the different contact number.

\* \* \* \* \*